US012304470B2

(12) United States Patent
Nagata et al.

(10) Patent No.: US 12,304,470 B2
(45) Date of Patent: May 20, 2025

(54) CABIN MANAGEMENT APPARATUS

(71) Applicant: TOYOTA JIDOSHA KABUSHIKI KAISHA, Toyota (JP)

(72) Inventors: Yu Nagata, Chofu (JP); Tomoyuki Kozuka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 37 days.

(21) Appl. No.: 18/382,599

(22) Filed: Oct. 23, 2023

(65) Prior Publication Data

US 2024/0140408 A1 May 2, 2024

(30) Foreign Application Priority Data

Oct. 27, 2022 (JP) .................... 2022-172745

(51) Int. Cl.
*B60W 30/09* (2012.01)
*B60W 10/30* (2006.01)

(52) U.S. Cl.
CPC ............ *B60W 30/09* (2013.01); *B60W 10/30* (2013.01); *B60W 2300/10* (2013.01)

(58) Field of Classification Search
CPC .. B60W 10/30; B60W 2300/10; B60W 30/09; B60W 60/0016; B60W 60/00253; B60W 60/007
See application file for complete search history.

(56) References Cited

U.S. PATENT DOCUMENTS

| | | | |
|---|---|---|---|
| 11,603,104 B2* | 3/2023 | Iwase | G06V 20/597 |
| 11,790,670 B2* | 10/2023 | Yoda | G06V 20/597 382/103 |
| 12,190,649 B2* | 1/2025 | Nagata | G07C 5/0808 |
| 2010/0039248 A1* | 2/2010 | Mauro | B60Q 9/00 340/433 |
| 2015/0338849 A1* | 11/2015 | Nemec | B60W 50/085 |
| 2017/0108862 A1* | 4/2017 | Mikkelsen | B60K 28/066 |
| 2018/0319291 A1* | 11/2018 | Dicanosa | G01S 13/04 |
| 2020/0130622 A1* | 4/2020 | Lerner | G01C 21/3697 |
| 2020/0231087 A1* | 7/2020 | Morimura | B60Q 1/52 |
| 2020/0406931 A1* | 12/2020 | Ide | B60W 60/0053 |
| 2021/0023918 A1* | 1/2021 | Nakano | B60J 3/04 |
| 2021/0387640 A1* | 12/2021 | Tamori | G16H 50/30 |
| 2022/0119005 A1* | 4/2022 | Gerrese | G05D 1/0055 |
| 2022/0176768 A1 | 6/2022 | Hokai et al. | |
| 2022/0337696 A1* | 10/2022 | Abutabl | H04M 1/72457 |

(Continued)

FOREIGN PATENT DOCUMENTS

JP 2022-091581 A 6/2022

*Primary Examiner* — Carl C Staubach
(74) *Attorney, Agent, or Firm* — Dinsmore & Shohl LLP (57) ABSTRACT

A cabin management apparatus according to the present disclosure is a cabin management apparatus configured to manage a cabin of a vehicle, the cabin management apparatus including a communication interface, an output interface, and a controller, wherein the controller is configured to receive, by the communication interface, emergency stop information for the vehicle, receive, by the communication interface, the degree of automated controllability over a door of the vehicle, and provide, by the output interface based on the emergency stop information, a different notification depending on the degree of automated controllability over the door.

7 Claims, 4 Drawing Sheets

(56) References Cited

U.S. PATENT DOCUMENTS

| | | | |
|---|---|---|---|
| 2023/0116572 A1* | 4/2023 | Bang | G05D 1/0038 |
| | | | 701/2 |
| 2023/0127977 A1* | 4/2023 | Haskin | H04W 12/08 |
| | | | 340/5.72 |
| 2023/0162377 A1* | 5/2023 | Izuno | G06V 20/59 |
| | | | 382/103 |
| 2023/0182776 A1* | 6/2023 | Plascencia-Vega | |
| | | | B60W 60/0015 |
| | | | 701/24 |
| 2023/0295963 A1* | 9/2023 | Kobayashi | B60K 35/80 |
| | | | 701/36 |
| 2024/0140467 A1* | 5/2024 | Nagata | B60W 60/00253 |
| 2024/0144808 A1* | 5/2024 | Nagata | G08G 1/161 |

* cited by examiner

FIG. 3

CABIN MANAGEMENT APPARATUS

CROSS-REFERENCE TO RELATED APPLICATION

This application claims priority to Japanese Patent Application No. 2022-172745, filed on Oct. 27, 2022, the entire contents of which are incorporated herein by reference.

TECHNICAL FIELD

The present disclosure relates to a cabin management apparatus.

BACKGROUND

In recent years, technology for remote control of vehicles by operators is known. For example, Patent Literature (PTL) 1 discloses an automated driving vehicle with a communication interface that communicates with an operator.

CITATION LIST

Patent Literature

PTL 1: JP 2022-091581 A

SUMMARY

With practical application of technology for remote control of vehicles, there is a need to further improve the usefulness of technology for managing cabins of the vehicles. For example, there is a need to reduce the anxiety of passengers in a cabin of a vehicle, which is associated with the loss of a person, such as a conductor or driver, who can manage the cabin, by remote control of the vehicle by an operator.

It would be helpful to improve the usefulness of technology for managing cabins of vehicles.

A cabin management apparatus according to an embodiment of the present disclosure is a cabin management apparatus configured to manage a cabin of a vehicle, the cabin management apparatus including:
 a communication interface;
 an output interface; and
 a controller,
 wherein the controller is configured to:
  receive, by the communication interface, emergency stop information for the vehicle;
  receive, by the communication interface, the degree of automated controllability over a door of the vehicle; and
  provide, by the output interface based on the emergency stop information, a different notification depending on the degree of automated controllability over the door.

According to an embodiment of the present disclosure, the usefulness of technology for managing cabins of vehicles is improved.

BRIEF DESCRIPTION OF THE DRAWINGS

In the accompanying drawings.

DETAILED DESCRIPTION

Hereinafter, an embodiment of the present disclosure will be described.

Outline of Embodiment

Figure 1:
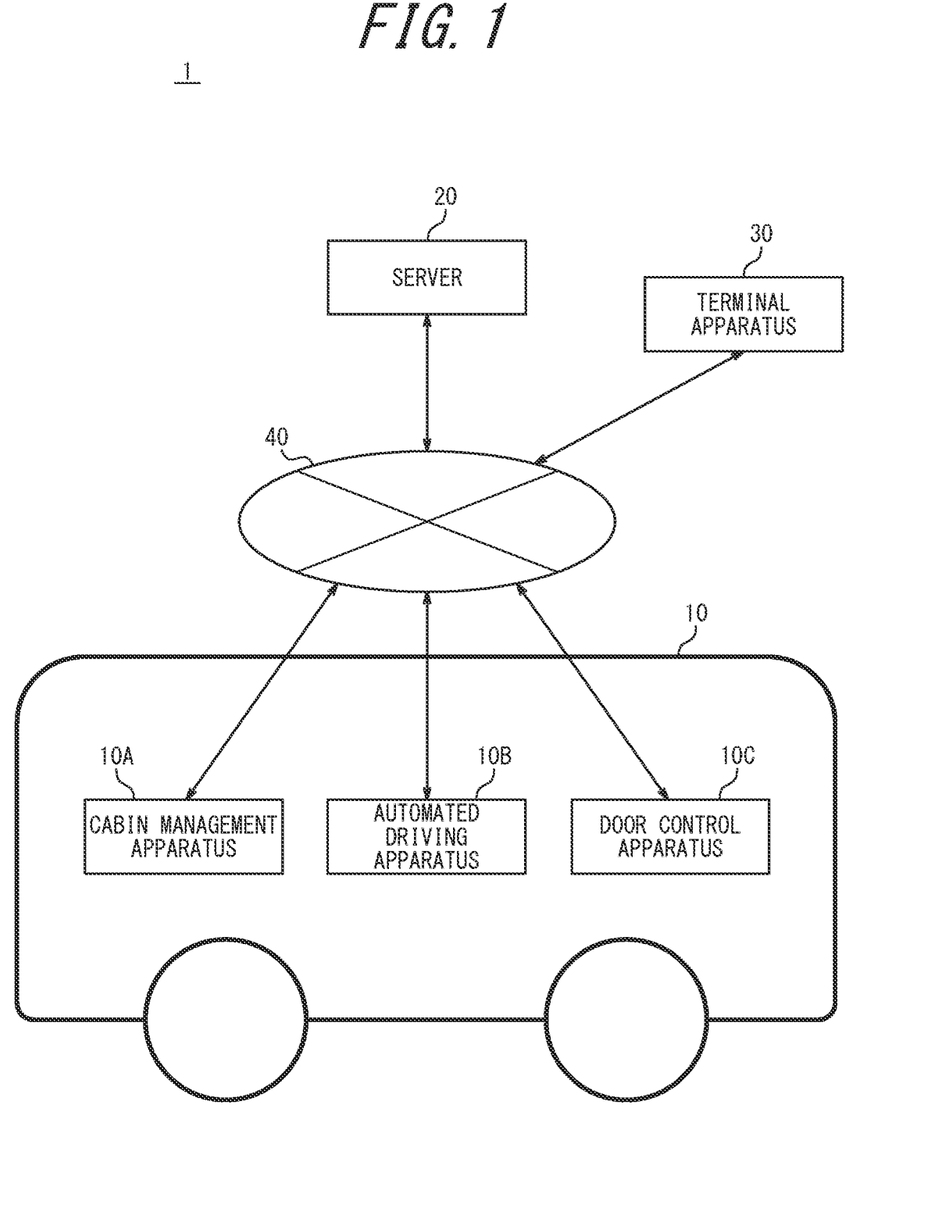
FIG. 1 is a block diagram illustrating a schematic configuration of a cabin management system according to an embodiment of the present disclosure.

With reference to FIG. 1, an outline of a cabin management system 1 according to an embodiment of the present disclosure will be described. FIG. 1 is a block diagram illustrating a schematic configuration of the cabin management system 1. The cabin management system 1 includes a vehicle 10, a server 20, and a terminal apparatus 30.

The vehicle 10 is, for example, a bus. However, the vehicle 10 is not limited to the bus, but may be any vehicle such as a passenger car, a motorcycle, or a truck. The vehicle 10 includes a cabin management apparatus 10A, an automated driving apparatus 10B, and a door control apparatus 10C. In other words, the cabin management apparatus 10A, the automated driving apparatus 10B, and the door control apparatus 10C are installed in the vehicle 10.

The cabin management apparatus 10A is configured to manage a cabin of the vehicle 10. The cabin management apparatus 10A may be, for example, a computer such as an Electronic Control Unit (ECU). The cabin is a space in the vehicle 10 in which one or more persons on board the vehicle 10 stay. The one or more persons on board the vehicle 10 are hereinafter also referred to as passengers of the vehicle 10.

The automated driving apparatus 10B is configured to perform control related to automated driving of the vehicle 10. The automated driving apparatus 10B may be, for example, an Autonomous Driving System (ADS), Advanced Driver Assistance Systems (ADAS), or a computer such as ECU. The automated driving apparatus 10B allows the vehicle 10 to travel by automated driving. The automated driving level of the vehicle 10 may be, for example, Level 3 to Level 4 according to the level classification defined by the Society of Automotive Engineers (SAE).

More specifically, in the present embodiment, the vehicle 10 may be configured to travel by automated driving, with remote control by a remote operator as needed. The vehicle 10 may be, for example, a bus that travels to stop, without a driver and conductor, boarding points or alighting points of the passengers. However, the automated driving level of the vehicle 10 is not limited to the levels described above. The vehicle 10 may be a vehicle 10 driven by a person with or without the assistance of the automated driving apparatus 10B.

The door control apparatus 10C is configured to control the opening, closing, or the like of a door of the vehicle 10. The door control apparatus 10C may be a computer such as an ECU. In the present embodiment, the door control apparatus 10C has a communication function to realize communication with the automated driving apparatus 10B and a door control function to control the opening or closing of the door. The communication function can be realized by a communication module, for example, and the door control function can be realized by a controller including a processor or the like. This allows the door control apparatus 10C to open or close the door based on a control command that is received from the automated driving apparatus 10B. However, the door control apparatus 10C may receive the control command from a computer other than the automated driving apparatus 10B, such as the cabin management apparatus 10A or the server 20. In the present disclosure, "open or close the door" refers to opening, closing, or both. "Open or close the door" also includes, in addition to opening or closing the door completely, opening or closing the door partially.

The server 20 is constituted of one or more computers. In the present embodiment, the server 20 may be constituted of a single computer or multiple computers that can communicate with each other, such as a cloud computing system.

The server 20 assists the travel of the vehicle 10. In the following description, the server 20 is also referred to as a travel assistance apparatus. For example, the server 20 enables the remote control of the vehicle 10 by the operator via the terminal apparatus 30.

The terminal apparatus 30 is a personal computer, for example, but not limited to this and may be any computer such as a smartphone or a tablet terminal. In the present embodiment, the terminal apparatus 30 is used by the operator who performs the remote control of the vehicle 10. The remote control of the vehicle 10 can include, for example, control over the travel of the vehicle 10, such as acceleration, deceleration, or steering of the vehicle 10. The remote control of the vehicle 10 can also include control other than the travel of the vehicle 10, such as opening or closing the door, confirming passengers seating, or making in-car announcements.

For the sake of simplicity, FIG. 1 illustrates one each of the vehicle 10, the server 20, and the terminal apparatus 30. However, the cabin management system 1 may include any number of vehicles 10, servers 20, and terminal apparatuses 30. The vehicle 10 (the cabin management apparatus 10A, the automated driving apparatus 10B, and the door control apparatus 10C), the server 20, and the terminal apparatus 30 are communicably connected to a network 40 including, for example, the Internet, a mobile communication network, or the like.

Although details will be described later, in the cabin management system 1 described above, the cabin management apparatus 10A is installed in the vehicle 10 and is used to manage the cabin of the vehicle 10 and to assist the passengers on board the vehicle 10. Specifically, the cabin management apparatus 10A receives emergency stop information for the vehicle 10 from the server 20 or the automated driving apparatus 10B, for example. The cabin management apparatus 10A then receives, for example, from the server 20 or the automated driving apparatus 10B, the degree of automated controllability over the door of the vehicle 10. The cabin management apparatus 10A provides, based on the emergency stop information, a different notification depending on the degree of automated controllability over the door.

As described above, according to the present embodiment, when information on an emergency stop that can occur during travel of the vehicle 10 is received, an appropriate notification can be provided depending on the degree of automated controllability over the door of the vehicle 10. This reduces the anxiety of the passengers in the cabin, even when a person who can manage the cabin of the vehicle 10 is not on board the vehicle 10. Therefore, according to the present embodiment, the usefulness of technology for managing the cabin of the vehicle 10 can be improved.

Figure 2:
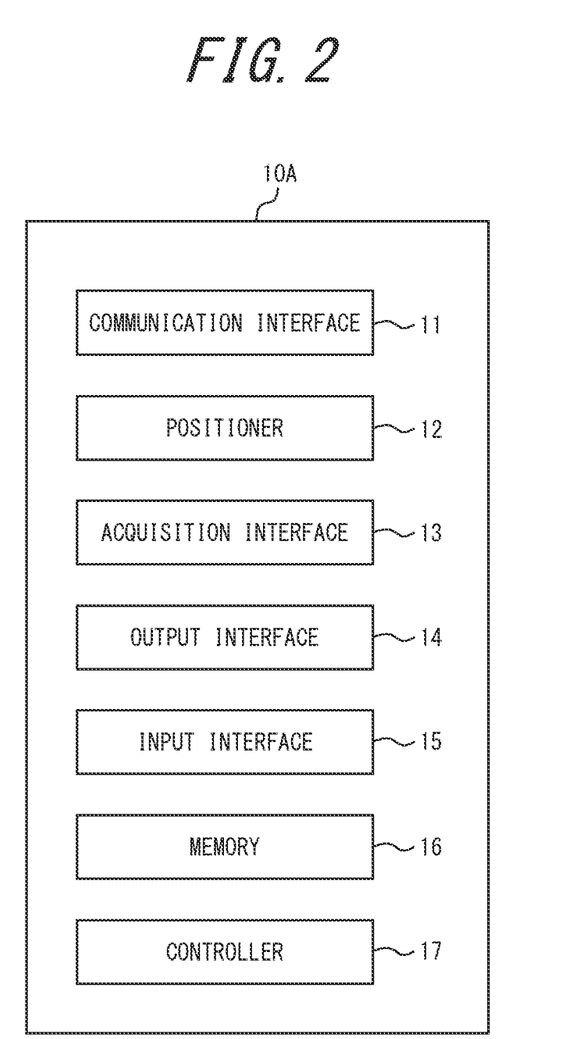
FIG. 2 is a block diagram illustrating a schematic configuration of a cabin management apparatus for a vehicle.
Figure 3:
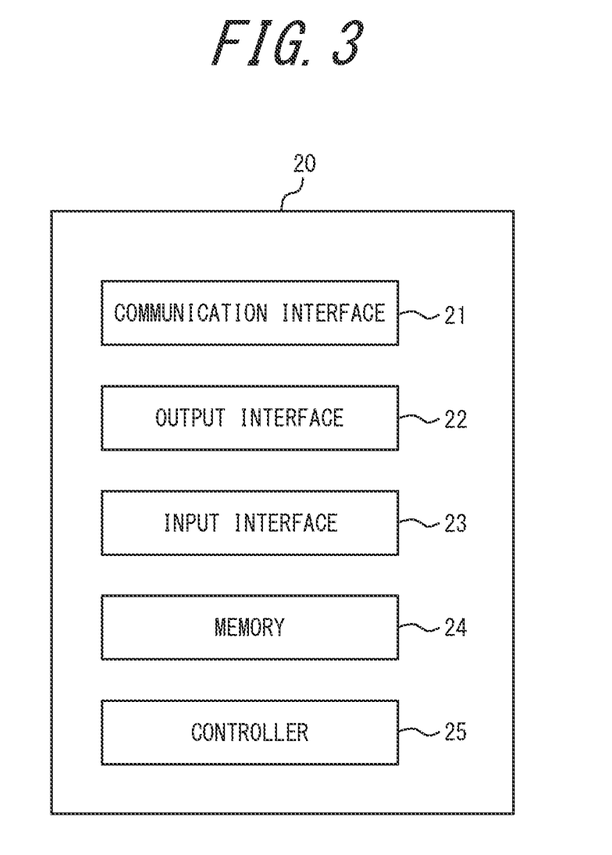
FIG. 3 is a block diagram illustrating a schematic configuration of a server.

Next, with reference to FIGS. 2 and 3, configurations of the cabin management system 1 will be described in detail. FIG. 2 is a block diagram illustrating a schematic configuration of the cabin management apparatus 10A of the vehicle 10. FIG. 3 is a block diagram illustrating a schematic configuration of the server 20.

(Configuration of Cabin Management Apparatus of Vehicle)

As illustrated in FIG. 2, the cabin management apparatus 10A of the vehicle 10 includes a communication interface 11, a positioner 12, an acquisition interface 13, an output interface 14, an input interface 15, a memory 16, and a controller 17. The communication interface 11, the positioner 12, the acquisition interface 13, the output interface 14, the input interface 15, the memory 16, and the controller 17 are communicably connected to each other via an in-vehicle network, such as a Controller Area Network (CAN), or dedicated lines, for example.

The communication interface 11 includes a communication module for connecting to the network 40. The communication module is, for example, a communication module compliant with a mobile communication standard such as the 4th Generation (4G) standard or the 5th Generation (5G) standard. The communication module may be, for example, a communication module compliant with a standard such as a wired Local Area Network (LAN) standard or a wireless LAN standard. The communication module may be a communication module compliant with a short-range wireless communication standard such as Wi-Fi® (Wi-Fi is a registered trademark in Japan, other countries, or both), Bluetooth® (Bluetooth is a registered trademark in Japan, other countries, or both), or an infrared communication standard. In the present embodiment, the cabin management apparatus 10A is connected to the network 40 via the communication interface 11. This enables the cabin management apparatus 10A to communicate with the server 20 or the like. The communication interface 11 of the cabin management apparatus 10A may be communicably connected to the automated driving apparatus 10B and the door control apparatus 10C via an in-vehicle network such as CAN. This allows the cabin management apparatus 10A to communicate with the automated driving apparatus 10B, the door control apparatus 10C, and the like via the communication interface 11.

The positioner 12 includes one or more positioning apparatuses capable of generating positional information on the vehicle 10. The positional information on the vehicle 10 is, for example, coordinates such as the two-dimensional coordinates or three-dimensional coordinates of a location at which the vehicle 10 is present. The positioner 12 generates the positional information on the vehicle 10 by navigation using a satellite positioning system, autonomous navigation, or a combination of these. The positioner 12 may include a receiver compatible with a satellite positioning system such as the Global Positioning System (GPS) to generate the positional information on the vehicle 10 by navigation using the satellite positioning system. The positioner 12 may include a sensor such as an acceleration sensor or a gyro sensor, to generate the positional information on the vehicle 10 by autonomous navigation.

The acquisition interface 13 includes at least one sensor. The at least one sensor included in the acquisition interface 13 is located in such a position as to be able to acquire information in the cabin of the vehicle 10. For example, the sensor is a camera installed in such a position as to be able to capture images in the cabin of the vehicle 10. However, the sensor is not limited to the camera, but may be any sensor, such as a motion sensor, a contact sensor, an infrared sensor, a door open/close sensor, or an IC card reader.

The output interface 14 includes at least one output apparatus. The output apparatus is, for example, a display, a digital signage, a speaker, a lamp, or the like. The output interface 14 outputs images, sound, light, or the like. The output apparatus is directed into the cabin of the vehicle 10. However, the output interface 14 may include an output apparatus installed toward the outside of the vehicle 10.

The input interface 15 includes at least one input apparatus. The input apparatus is, for example, a touch panel, a camera, a microphone, or the like. The input interface 15 accepts input operations by a user.

The memory 16 is, for example, a semiconductor memory, a magnetic memory, an optical memory, or the like. The memory 16 may function as, for example, a main memory, an auxiliary memory, or a cache memory. The memory 16 stores any information to be used for operations of the cabin management apparatus 10A. For example, the memory 16 stores a system program, an application program, embedded software, or the like. The information stored in the memory 16 may be updated with, for example, information acquired from the network 40 via the communication interface 11.

The controller 17 includes at least one processor. The processor may be, for example, a general purpose processor such as a Central Processing Unit (CPU), a dedicated processor that is dedicated to specific processing, or the like. The controller 17 is not limited to a processor and may include at least one dedicated circuit. The dedicated circuit may be, for example, a Field-Programmable Gate Array (FPGA) or an Application Specific Integrated Circuit (ASIC). The controller 17 controls the components including the communication interface 11, the positioner 12, the acquisition interface 13, the output interface 14, the input interface 15, and the memory 16, which are described above, in order to realize the functions of the cabin management apparatus 10A, including the functions of the components.
(Configuration of Server)

Next, with reference to FIG. 3, a configuration of the server 20 will be described in detail. FIG. 3 is a block diagram illustrating a schematic configuration of the server 20.

As illustrated in FIG. 3, the server 20 includes a communication interface 21, an output interface 22, an input interface 23, a memory 24, and a controller 25. The communication interface 21, the output interface 22, the input interface 23, the memory 24, and the controller 25 are communicably connected to one another with wires or wirelessly.

The communication interface 21 includes a communication module for connecting to the network 40. The communication module is, for example, a communication module compliant with a mobile communication standard such as the 4G standard or the 5G standard. The communication module may be, for example, a communication module compliant with a standard such as a wired LAN standard or a wireless LAN standard. The communication module may be a communication module compliant with a short-range wireless communication standard such as Wi-Fi®, Bluetooth®, or an infrared communication standard. In the present embodiment, the server 20 is connected to the network 40 via the communication interface 21. This allows the server 20 to communicate with the cabin management apparatus 10A and the automated driving apparatus 10B of the vehicle 10, as well as the terminal apparatus 30 and other devices.

The output interface 22 includes at least one output apparatus. The output apparatus is, for example, a display, a speaker, a lamp, or the like. The output interface 22 outputs images, sound, light, or the like.

The input interface 23 includes at least one input apparatus. The input apparatus is, for example, a touch panel, a camera, a microphone, or the like. The input interface 23 accepts input operations by a user.

The memory 24 is, for example, a semiconductor memory, a magnetic memory, an optical memory, or the like. The memory 24 may function as, for example, a main memory, an auxiliary memory, or a cache memory. The memory 24 stores any information to be used for operations of the server 20. For example, the memory 24 stores a system program, an application program, embedded software, or the like. The information stored in the memory 24 may be updated with, for example, information acquired from the network 40 via the communication interface 21.

The controller 25 includes at least one processor. The processor may be, for example, a general purpose processor such as a CPU, a dedicated processor that is dedicated to specific processing, or the like. The controller 25 is not limited to a processor and may include at least one dedicated circuit. The dedicated circuit may be, for example, an FPGA or an ASIC. The controller 25 controls the components including the communication interface 21, the output interface 22, the input interface 23, and the memory 24, which are described above, in order to realize the functions of the server 20, including the functions of the components.
(Operations of Cabin Management System)

Figure 4:
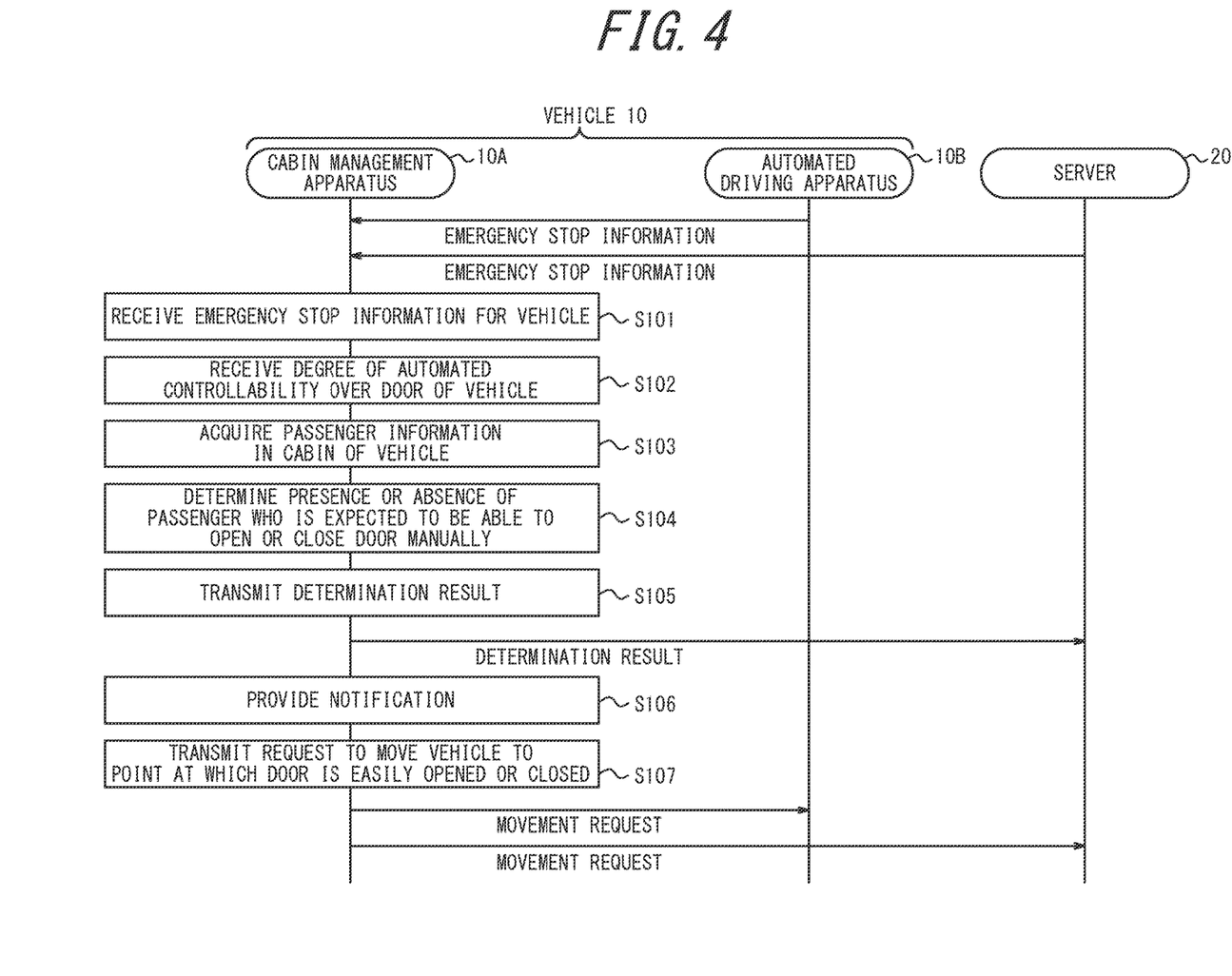
FIG. 4 is a flowchart illustrating operations of the cabin management system.

Operations for managing the cabin of the vehicle 10 by the cabin management system 1 will be described with reference to FIG. 4. FIG. 4 is a flowchart illustrating the operations of the cabin management system 1. The flowchart in FIG. 4 illustrates operations of the cabin management apparatus 10A and the automated driving apparatus 10B of the vehicle 10, and the server 20, which are included in the cabin management system 1. Therefore, the description of these operations corresponds to a method for controlling the cabin management system 1, and also corresponds to a method for controlling each of the cabin management apparatus 10A, the automated driving apparatus 10B, and the door control apparatus 10C of the vehicle 10, and the server 20, which are included in the cabin management system 1.

In step S101, the controller 17 of the cabin management apparatus 10A receives, by the communication interface 11, emergency stop information for the vehicle 10.

The emergency stop information for the vehicle 10 is, for example, information regarding an emergency stop of the vehicle 10. The emergency stop information can include, for example, an estimated time of occurrence of the emergency stop and an estimated stop point. For example, the emergency stop may be an event that is foreseen to occur as a result of processing by the automated driving apparatus 10B or a remote operation by an operator. Alternatively, the emergency stop may be an event that is determined by the server 20 to be likely to occur based on road congestion, the occurrence of an accident or construction work, or the like on a travel route for the vehicle 10.

The emergency stop information for the vehicle 10 may include information on whether the door of the vehicle 10 needs to be opened or closed. For example, the emergency stop information due to engine trouble in the vehicle 10 may include information that the door of the vehicle 10 needs to be opened or closed. For example, the emergency stop information due to a temporary torrential downpour may include information that the door of the vehicle 10 does not need to be opened or closed. The controller 17 of the cabin management apparatus 10A may perform the processes of step S102 and beyond only in a case in which the emergency stop information for the vehicle 10 includes information that the door of the vehicle 10 needs to be opened or closed. This reduces power consumption by the cabin management apparatus 10A.

The controller 17 of the cabin management apparatus 10A may receive, by the communication interface 11, the emergency stop information for the vehicle 10 from the server 20 or the automated driving apparatus 10B. For example, the automated driving apparatus 10B may generate the emergency stop information for the vehicle 10 when the automated driving apparatus 10B detects, by a sensor, an accidental vehicle stopped 30 meters ahead. In such a case, the emergency stop information is transmitted from the automated driving apparatus 10B to the cabin management apparatus 10A. Alternatively, when the terminal apparatus 30 accepts an input operation for the emergency stop by the operator and the input operation is transmitted from the terminal apparatus 30 to the server 20, the server 20 may generate the emergency stop information for the vehicle 10. In such a case, the emergency stop information is transmitted from the server 20 to the cabin management apparatus 10A. The controller 17 may store, in the memory 16, the received emergency stop information for the vehicle 10. However, the cabin management apparatus 10A may acquire the emergency stop information from a computer other than the server 20 or the automated driving apparatus 10B.

The controller 17 of the cabin management apparatus 10A may repeat step S101 at predetermined timing until receiving the emergency stop information for the vehicle 10. The controller 17 may perform the processes of step S102 and beyond upon receiving the emergency stop information for the vehicle 10.

In step S102, the controller 17 of the cabin management apparatus 10A receives, by the communication interface 11, the degree of automated controllability over the door of the vehicle 10.

The degree of automated controllability over the door of the vehicle 10 is information indicating whether the door of the vehicle 10 can be controlled by the door control apparatus 10C. For example, in the present embodiment, the degree of automated controllability over the door may include three states: (1) a fully automated state, (2) a semi-automated state, and (3) a fully manual state. The fully automated state is a state in which the door control apparatus 10C can open or close the door based on a control command from the automated driving apparatus 10B. The semi-automated state is a state in which although a door opening/closing function of the door control apparatus 10C is operable, the door control apparatus 10C cannot be normally controlled by the automated driving apparatus 10B due to communication failure with the automated driving apparatus 10B, or the like. The semi-automated state is a state in which the door control apparatus 10C can open or close the door by a passenger directly operating the door control apparatus 10C, for example, by pressing an "open/close button" provided next to the door of the vehicle 10. The fully manual state is a state in which the door opening/closing function of the door control apparatus 10C is not operable. The fully manual state is a state in which a passenger has to manually open or close the door.

Any method can be employed to receive the degree of automated controllability over the door of the vehicle 10. For example, the server 20 may determine the degree of automated controllability over the door by monitoring life and death of the automated driving apparatus 10B and the door control apparatus 10C. In such a case, the controller 17 of the cabin management apparatus 10A can receive, from the server 20, the degree of automated controllability over the door of the vehicle 10. Alternatively, the automated driving apparatus 10B or the door control apparatus 10C may determine the degree of automated controllability over the door. In such a case, the controller 17 may receive, via the communication interface 11, the degree of automated controllability over the door from the automated driving apparatus 10B or the door control apparatus 10C. The controller 17 may store, in the memory 16, the received degree of automated controllability over the door of the vehicle 10.

In step S103, the controller 17 of the cabin management apparatus 10A acquires, by the acquisition interface 13, passenger information regarding one or more passengers in the cabin of the vehicle 10.

The passenger information on the vehicle 10 may include, for example, characteristics, such as body sizes, ages, or genders, of the passengers in the cabin of vehicle 10. In addition to the characteristics of the passengers, the passenger information on the vehicle 10 may include any information regarding the passengers, such as the number of passengers or the boarding positions of the passengers in the cabin.

Any method can be employed to acquire the passenger information on the vehicle 10. For example, in a case in which the acquisition interface 13 of the cabin management apparatus 10A includes a camera, the controller 17 may capture, with the camera, images of the interior of the cabin of the vehicle 10. The controller 17 may identify the passengers in the images of the interior of the cabin of the vehicle 10 using an analytical algorithm and determine the characteristics of the identified passengers. Alternatively, in a case in which the acquisition interface 13 of the cabin management apparatus 10A includes an IC card reader, the controller 17 may acquire, by the IC card reader, the passenger information registered on IC cards held by the passengers. The controller 17 may store, in the memory 16, the acquired passenger information on the vehicle 10.

The analysis algorithm may be constructed by a statistical method such as machine learning or deep learning. For example, the analysis algorithm may be tuned by a statistical method based on a history of the passenger information generated in the past and the results of human evaluation on the passenger information. The accumulation of the history of the passenger information thereby allows to improve accuracy in acquisition of the passenger information. However, the analysis algorithm may be expressed by a predetermined relational formula that is not based on statistical methods.

The controller 17 of the cabin management apparatus 10A may perform processes of step S104 and beyond in a case in which the controller 17 has determined, based on the passenger information on the vehicle 10, that there is at least one passenger in the cabin of the vehicle 10.

In step S104, the controller 17 of the cabin management apparatus 10A determines, based on the passenger information acquired in step S103, the presence or absence of a passenger who is expected to be able to open or close the door manually, among the one or more passengers.

For example, the controller 17 of the cabin management apparatus 10A may store, in the memory 16 in advance, conditions for the passenger who is expected to be able to open or close the door manually. The controller 17 can determine the presence or absence of the passenger who is expected to be able to open or close the door manually, among the one or more passengers, by comparison between the passenger information acquired in step S103 and the conditions for the passenger described above.

In step S105, the controller 17 of the cabin management apparatus 10A transmits, to the server 20, the determination result of the presence or absence of the passenger who is expected to be able to open or close the door manually. The server 20 can display the determination result on the terminal apparatus 30. This allows the operator to remotely open or close the door, to remotely make announcements, to arrange for a temporary vehicle or a rescue worker, or the like in a case in which there is no passenger, in the cabin of the vehicle 10, who is expected to be able to open or close the door.

In step S106, the controller 17 of the cabin management apparatus 10A provides, by the output interface 14 based on the emergency stop information, a different notification depending on the degree of automated controllability over the door.

Any method can be used to provide a notification in the cabin of the vehicle 10. For example, in a case in which the output interface 14 of the cabin management apparatus 10A includes a digital signage, the controller 17 may display information regarding the emergency stop information on the digital signage. For example, in a case in which the output interface 14 of the cabin management apparatus 10A includes a speaker, the controller 17 may output information regarding the emergency stop information from the speaker.

At this time, the controller 17 of the cabin management apparatus 10A can change the notification by the output interface 14 according to the passenger information.

As a first example, in step S106, the controller 17 of the cabin management apparatus 10A may determine, based on the degree of automated controllability over the door, whether to need work by a passenger in the cabin to open or close the door. The controller 17 may provide a different notification depending on whether to need the work by the passenger.

For example, the controller 17 determines that the work by the passenger is not needed in a case in which the degree of automated controllability over the door is (1) fully automated state. In such a case, the controller 17 may provide, by the output interface 14, a notification that the passengers should wait for the door to open automatically. On the other hand, the controller 17 determines that the work by the passenger is needed in a case in which the degree of automated controllability over the door is (2) semi-automated state or (3) fully manual state. In such a case, the controller 17 may provide, by the output interface 14, a notification that requests cooperation from the passengers. This allows the passengers in the cabin to know what action to take in the future.

As a second example, in step S106, the controller 17 of the cabin 25 management apparatus 10A may provide a different notification depending on the presence or absence of the passenger who is expected to be able to open or close the door manually as determined in step S104.

For example, in a case in which there is a passenger who is expected to be able to open or close the door manually, among the one or more passengers of the vehicle 10, the controller 17 of the cabin management apparatus 10A may provide, by the output interface 14, a notification that requests cooperation from the passenger. On the other hand, in a case in which there is no passenger who is expected to be able to open or close the door manually, among the one or more passengers of the vehicle 10, the controller 17 of the cabin management apparatus 10A may provide, by the output interface 14 to the cabin, a notification that asks the passengers to wait for arrival of help. This allows the cabin management apparatus 10A to provide an appropriate instruction according to the passengers in the cabin. The controller 17 may combine the first and second examples to provide a different notification depending on whether to need the work by the passenger and the presence or absence of the passenger who is expected to be able to open or close the door manually.

In step S107, in a case in which the controller 17 of the cabin management apparatus 10A has determined that there is no passenger who is expected to be able to open or close the door, among the one or more passengers in the vehicle 10, the controller 17 transmits, by the communication interface 11 to the automated driving apparatus 10B or the server 20, a request to move the vehicle 10 to a point at which the door of the vehicle 10 is easily opened or closed. The point at which the door of the vehicle 10 is easily opened or closed is, for example, on a slope. The inclination of the vehicle 10 on the slope makes it easier for the passengers to open the door due to the weight of the door.

As described above, the cabin management apparatus 10A according to the present embodiment receives, by the communication interface 11, the emergency stop information for the vehicle 10 and the degree of automated controllability over the door of the vehicle 10. The cabin management apparatus 10A provides, by the output interface 14 based on the emergency stop information, the different notification depending on the degree of automated controllability over the door.

According to such a configuration, when information on an emergency stop that can occur during travel of the vehicle 10 is received, an appropriate notification can be provided depending on the degree of automated controllability over the door of the vehicle 10. This reduces the anxiety of the passengers in the cabin, even when a person who can manage the cabin of the vehicle 10 is not on board the vehicle 10. Therefore, according to the present embodiment, the usefulness of technology for managing the cabin of the vehicle 10 can be improved.

While the present disclosure has been described with reference to the drawings and examples, it should be noted that various modifications and revisions may be implemented by those skilled in the art based on the present disclosure. Accordingly, such modifications and revisions are included within the scope of the present disclosure. For example, functions or the like included in each component, each step, or the like can be rearranged without logical inconsistency, and a plurality of components, steps, or the like can be combined into one or divided.

For example, an embodiment in which a general purpose computer functions as the cabin management apparatus 10A according to the above embodiment can also be implemented. Specifically, a program in which processes for realizing the functions of the cabin management apparatus 10A according to the above embodiment are written may be stored in a memory of a general purpose computer, and the program may be read and executed by a processor. Accordingly, the present disclosure can also be implemented as a program executable by a processor, or a non-transitory computer readable medium storing the program. Examples of the non-transitory computer readable medium include a magnetic storage device, an optical disc, a magneto-optical storage medium, and a semiconductor memory.

For example, in the embodiment described above, the cabin management apparatus 10A, the automated driving apparatus 10B, and the door control apparatus 10C are installed in the vehicle 10, but are not limited to this. The server 20 may be configured to execute some or all of the operations and processing executed by the cabin management apparatus 10A, the automated driving apparatus 10B, or the door control apparatus 10C. Similarly, an apparatus installed in the vehicle 10, such as the cabin management apparatus 10A, the automated driving apparatus 10B, or the door control apparatus 10C, may be configured to execute some of the operations and processing executed by the server 20.

For example, in the embodiment described above, the cabin management apparatus 10A, the automated driving apparatus 10B, and the door control apparatus 10C are installed separately in the vehicle 10, but may be installed in the vehicle 10 as a single unit.

The invention claimed is:

1. A cabin management apparatus configured to manage a cabin of a vehicle, the cabin management apparatus comprising:
 a communication interface;
 an output interface; and
 a processor configured to:
 receive, by the communication interface, emergency stop information for the vehicle;
 receive, by the communication interface, a degree of automated controllability over a door of the vehicle; and
 provide, by the output interface based on the emergency stop information, a different notification depending on the degree of automated controllability over the door,
 wherein the degree of automated controllability includes:
 a first state in which the door is automatically opened or closed based on a control command,
 a second state in which the door cannot be automatically controlled, and is opened or closed by pressing a button provided in the cabin, and
 a third state in which the door is not operable, and has to be manually opened or closed.

2. The cabin management apparatus according to claim 1, wherein the emergency stop information includes information on whether the door of the vehicle needs to be opened or closed.

3. The cabin management apparatus according to claim 1, wherein the processor is configured to:
 determine, based on the degree of automated controllability over the door, whether to need work by a passenger in the cabin to open or close the door; and
 provide a different notification depending on whether to need the work by the passenger.

4. The cabin management apparatus according to claim 1, further comprising an acquisition interface,
 wherein the processor is configured to:
 acquire, via the acquisition interface, passenger information regarding one or more passengers in the cabin;
 determine, based on the passenger information, presence or absence of a passenger who is expected to be able to open or close the door manually, among the one or more passengers; and
 provide a different notification depending on the presence or absence of the passenger who is expected to be able to open or close the door manually.

5. The cabin management apparatus according to claim 4, wherein the processor is configured, upon determining the absence of the passenger who is expected to be able to open or close the door manually, to transmit, by the communication interface, a request to move the vehicle to a point at which the door of the vehicle is easily opened or closed.

6. The cabin management apparatus according to claim 3, wherein the processor is configured to:
 in the first state, determine that the work by the passenger is not needed, and provide a first notification that passengers in the cabin should wait for the door to open automatically; and
 in the second or third state, determine that the work by the passenger is needed, and provide a second notification that requests cooperation from the passengers.

7. The cabin management apparatus according to claim 4, wherein the processor is configured to:
 based on determining that there is a passenger who is expected to be able to open or close the door manually, among the one or more passengers of the vehicle, provide a first notification that requests cooperation from the passenger; and
 based on determining that there is no passenger who is expected to be able to open or close the door manually, among the one or more passengers of the vehicle, provide a second notification that asks the one or more passengers to wait for arrival of help.

* * * * *